Figure 2:
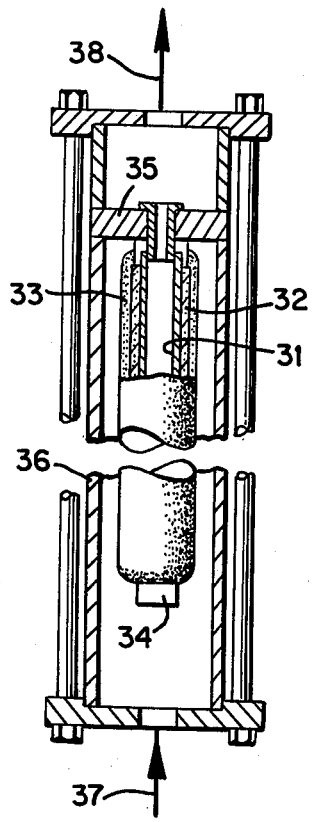

United States Patent [19]

Strub

[11] 4,288,330
[45] Sep. 8, 1981

[54] SUPPORT WITH ROTARY SYMMETRIC OPENINGS FOR FILTER AID, METHOD AND APPARATUS

[75] Inventor: Fritz Strub, St. Gallen, Switzerland

[73] Assignee: Filtrox Maschinenbau AG, St. Gallen, Switzerland

[21] Appl. No.: 751,220

[22] Filed: Dec. 16, 1976

Related U.S. Application Data

[63] Continuation of Ser. No. 457,205, Apr. 2, 1974, abandoned.

[30] Foreign Application Priority Data

Apr. 3, 1973 [CH] Switzerland .......................... 4729/73

[51] Int. Cl.³ ............................................. B01D 37/02
[52] U.S. Cl. .................................. 210/777; 210/498; 210/497.01
[58] Field of Search .... 219/121 L, 121 LM, 121 EM, 219/121 EB; 331/94.5 A; 350/321; 29/163.5; 210/497, 498, 323 T, 459, 460, 193, 777

[56] References Cited

U.S. PATENT DOCUMENTS

| | | | |
|---|---|---|---|
| 1,916,393 | 7/1933 | Smith | 210/498 |
| 2,267,752 | 12/1941 | Ruska et al. | 210/498 X |
| 3,177,945 | 4/1965 | Tether | 210/498 X |
| 3,243,724 | 3/1966 | Vuylstehe | 219/121 LM |
| 3,265,855 | 8/1966 | Norton | 219/121 LM X |
| 3,289,099 | 11/1966 | Masters | 331/94.5 |
| 3,359,192 | 12/1967 | Heinrich et al. | 210/498 X |
| 3,404,254 | 10/1968 | Jones | 219/121 EM |
| 3,482,703 | 12/1969 | Roberts et al. | 210/498 X |
| 3,520,418 | 7/1970 | Guinard | 210/498 |
| 3,534,472 | 10/1970 | De Jong et al. | 219/121 LM X |
| 3,535,778 | 10/1970 | Lalanga et al. | 219/121 LM X |
| 3,598,242 | 8/1971 | Mott | 210/323 |
| 3,657,510 | 4/1972 | Rothnock | 219/121 L |
| 3,679,052 | 7/1972 | Asper | 210/75 |
| 3,708,848 | 1/1973 | Guinard | 210/498 |
| 3,755,646 | 8/1973 | Mullen | 219/121 LM |
| 3,782,823 | 1/1974 | Kanstock et al. | 331/94.5 A X |
| 3,805,015 | 4/1974 | Herrigen et al. | 219/121 L |
| 3,806,829 | 4/1974 | Duston et al. | 331/94.5 |
| 3,974,068 | 8/1976 | Ebner | 210/75 |

*Primary Examiner*—Theodore A. Granger
*Attorney, Agent, or Firm*—William J. Daniel

[57] ABSTRACT

Apparatus and process settling layer filtration in which the liquid to be filtered is passed through a layer of settling layer particles settled directly upon a self-supporting support member, the support member is a plate or tube, e.g. candle filter tube, perforated by a multitudinous array of holes of circular cross-sectional shape having a diameter at their smallest point in the range of 50-250 microns, and larger than the largest dimension of the larger particles, with a density of 20-400 opening per sq. cm. of member surface area whereby the layer particles form over such circular opening dome-shaped arches exhibiting increased strength and stability during actual filtration. An effective technique for producing such members by means of laser beam drilling is disclosed.

3 Claims, 5 Drawing Figures

SUPPORT WITH ROTARY SYMMETRIC OPENINGS FOR FILTER AID, METHOD AND APPARATUS

This is a continuation of Ser. No. 457,205, filed Apr. 2, 1974, now abandoned.

The invention relates to a method of production of a liquid-permeable plate or a tube for filtering plant, in particular for settling layer filters, to a filter candle produced according to said method, and also to the utilisation of the same for settling layer filtration.

One of the problems of filtering technology that has not yet been satisfactorily solved is the production of bearing surfaces, i.e. support members for the so-called settling filters that are liquid-permeable in every respect. In settling layer filtration a layer of filtering auxiliary materials, usually kieselguhr particules, is deposited on a support member and it is this layer, which at the time of the subsequent filtration constitutes the actual filtering layer and retain the trub, i.e. sediment, contained in the liquid to be filtered. Settling filters are particularly advantageous since the actual filtering layer, in and upon which the trub is deposited can be "replaced" without difficulty by removal, e.g. rewashing, and by the settling of a new settling layer, whenever the trub has considerably soiled the layer after a certain period of operation.

The following are the requirements for an effective settling layer support member.

In the first place the members and the perforations which make them liquid-permeable must be devised in such a manner that after the formation of the settling layer practically no filtering auxiliary substance particles can any longer pass through the perforations or even to enter their openings, whereas any filtering auxiliary substance particles which do enter the perforations during the formation of the settling layer cannot become caught or trapped inside such perforations. The requirement that the particles of filtering agent should not be able to pass through the perforations seems at first glance to be easily achievable simply by making the width of opening of the perforations smaller than the particle size of the particles of filtering agent. With kieselguhr, which is regularly used in practice as filtering agent, however, this is not possible as the particle size of the kieselguhr particles is within the range of about 2 to 60 microns so that holes with an opening width of an order of size of one micron would have to be made to prevent the kieselguhr particles from passing through the holes. In practice, however, such a solution must be completely ruled out since such holes, which must have a wall thickness in the order of size of one millimeter to satisfy the ratio connected therewith of some 1000:1 for length with respect to diameter, are definitely not produceable and, in addition, a normal sized filter candle, for example, would have to be provided with about one billion holes.

However, practice has now shown that it is definitely not necessary in order to meet the requirement that after the formation of the settling layer practically no particles of filtering agent should any longer pass along the support member perforations or be able to enter their openings to use, holes with a smaller opening width than the particle size of the filtering agents, as the particles of kieselguhr used as filtering agent build, during the settling, so-called kieselguhr bridges over the openings of the perforations, which "bridges" cover the openings and prevent subsequent kieselguhr particles from entering these openings.

This formation of bridges over the openings of the perforations up to now has been explained by to the property which kieselguhr particles have of interlocking together because of their frame-like, strongly structured or irregular shape, which permits them to form agglomerates of considerably greater size than that of the individual kieselguhr particles, which agglomerate, assuming that the opening width of the support perforations is smaller than the size of said agglomerates, remain hanging on the openings of the perforations and cover them. In fact, it is possible to observe such agglomerates of kieselguhr particles in a liquid prepared beforehand for the formation of a settling layer and mixed with kieselguhr, and this observation appeared to confirm the truth of the above theory for the formation of bridges of kieselguhr particles.

If it is true that bridge formation over the openings of settling layer support is based upon the agglomerate formation of kieselguhr particles, then it is sufficient to achieve the desired bridge-like suspension of the agglomerates over the openings of the perforations, for the perforations to have only one of their two transversal dimensions narrower than the dimensions of the agglomerates, and this requirement is met by slot or slit shaped perforations. If the slots or slits in such a case are slightly narrower in width than the mean size of the agglomerates, then the bearing surface by means of which each agglomerate supports itself on the two sides or margins of the slot or slit is not substantially smaller than the bearing surface which would be provided for the same agglomerate if there were used, instead of the slot or slit, a circular hole, having a hole diameter corresponding to the opening width of the slot or slit. Consequently, insofar as the support of the agglomerates is concerned a slot or slit is virtually as good as a circular hole with the same effective opening width as the slot or slit. However, the area of the opening of a slot or slit situated under the agglomerate is naturally considerably greater than the opening area of a circular hole, so that from the standpoint of volume flowput, there is a definite advantage with perforations made in slot or slit form over flow paths made in the form of circular holes. Therefore, anyone considering the problem of how to shape settling layer support member perforations and believed the accepted explanation for bridge formation based on the agglomerate formation of the kieselguhr particles would naturally be led to the conclusion that a slot or slit form for such perforations is more advantageous than a circular form.

This is particularly true since slot or slit shaped flow paths with sufficiently small slot or slit width, in contrast to circular holes of correspondingly small hole diameter, can be made industrially without considerable difficulties.

In any event, the fact remains that before this invention, supporting members of the type in question with circular holes of correspondingly small hole diameters (under 300 microns) are not known in the art of settling layer filtration. Only support plates and support tubes with relatively large-sized circular holes (with, as a rule, a diameter in excess of 1 mm) have been used for settling filters but these do not themselves serve as liquid-permeable support members in direct contact with the settling layer, but rather act as backing supports for other kinds of supporting members, which themselves do not possess adequate mechanical stability or strength, in particular for so-called mesh fabrics (sieve-type fabrics made of metal wire) or for a wire coil forming the actual layer supporting surface and which is made of wire laid around the tube in a helical pattern with a definite spacing of (e.g. 100 microns) between the individual windings.

Exhaustive experimental investigations by the applicant, however, have not shown that the bridge formation over the openings of the support member openings is based upon an arch-like formation of the kieselguhr particles over the top of such openings, i.e. a tunnel-shaped arch when deposited over a slot or slit or a dome-shaped arch of kieselguhr particles when similarly deposited over a circular hole, and also when the inner space of the arch lying over the opening is free from kieselguhr particles after the settling. Furthermore it has been determined that the stability of the tunnel-shaped arches of kieselguhr particles deposited over slots or slits, with respect to pressure fluctuations, as occur for example upon alteration of the valve position of a valve disposed on the inlet side of the settling filter, is considerably smaller than the stability of the dome-shaped arches of kieselguhr particles deposited over circular holes with respect to the same pressure fluctuations. This difference in stability is explainable in terms of the stability properties of tunnel and dome-shaped arches when analyzed according to constructional statics. For the same reasons also, the maximum permissible pressure difference between the inlet side and the outlet side of the filter system using slot or slit-shaped flow openings under conditions otherwise completely the same is smaller than in the case of flow openings formed of circular holes.

A further result of the investigations mentioned above was that not only the cross-sectional shaped of the flow openings but also the shape of the marginal or surface areas which delimit the flow openings in the immediate vicinity thereof of play an important role in the achievement of a stable, uniform settling layer. It is essential in this connection that the marginal areas surrounding the flow paths should offer good support possibilities for the ends of the arches of kieselguhr particles deposited over the flow paths openings, and this result is achieved when the formation of the arch is even and symmetrical with respect to a centre line in all its cross-sectional planes taken through the arch and the supporting surfaces extend in all these cross-sectional planes vertically to the centre line and have on both sides of the flow opening at least one width corresponding approximately to the width of the opening of itself. The foregoing essential condition is fulfilled by plates and tubes provided with circular holes or also with slots and slits, but not, for example, by mesh fabrics in which the flow openings are necessarily limited by metal wires which, by reason both of their curved surfaces and their additional curvature or bending in the longitudinal direction, and of the relatively small width of the bearing surface provided marginally of the mesh opening, do not provide supporting possibilities that are any good at all but are indeed very defective at best, and therefore do not make possible any stable arch-like deposition of kieselguhr particles over the flow openings. (This is also the reason why when mesh fabrics have been used in practice, stable settling layers can be achieved only with difficulty, even when the mesh size is very small.)

Summarizing, when the result of the applicant's research is compared to all the possibilities available for the construction of the supports for settling layers (i.e. plate or tube shaped support members with slot or slit shaped flow openings, cylindrical support members formed of metal rings stacked one on top of the other and defining slot-shaped flow openings between the individual metal rings, wire coils with slit-like openings between the individual coil windings and supported by by plate-shaped or tube-shaped supports with large-diameter circular holes, supports formed of mesh fabrics supported on plate or tube shaped support members, and finally plate or tube shaped support members consisting of porous material that is liquid-permeable due to such porosity), the plate or tube-shaped support members according to the invention having with circular holes having a diameter of less than 300 microns as flow openings offer by far the most favourable conditions and possess the greatest advantages. This conclusion is contrary to the view held hitherto in technical circles in the settling layer filtration area that surfaces support members with slot or slit shaped flow paths were the most advantageous. The reasons for this conclusion have already been given above in terms of the advantages of support members with circular holes compared with support members with slot or slit-shaped flow openings. To these can be briefly added the reasons why the two remaining possibilities, i.e. mesh fabrics and porous material, are disadvantageous compared with members with circular flow holes. Both of these possibilities do indeed also offer flow openings with cross-sectional areas, the two cross-sectional dimensions of which are approximately equal, and which accordingly should in theory give similary good results as circular flow holes, especially since the mesh width in mesh fabrics can easily be made quite small, and the pore diameter of porous material is as a rule still smaller still. A mesh fabric, however, as already indicated above, is not very suitable for the formation of stable and uniform settling layers and, in addition, does not have any strength or stability of its own, so that additional supporting members are necessary for the support of the mesh fabric. The areas where the mesh fabric contacts the additional supporting members constitute areas for the accumulation of dirt which is not removed during the replacement of the settling layer. These three points, that is to say a bad and uneven formation of the settling layer, the need for additional supporting members and the danger of dirt accumulation, are the greatest disadvantages of mesh fabrics as compared to plate or tube shaped support members with circular flow holes. The chief drawback against using porous material as a support for settling layers is the tendency of porous material to become clogged up in a relatively short space of time, because the flow paths extending through porous material are not rectilinear but twisted, and their walls are not smooth but rough, which causes fine trub and kieselguhr particles to remain in the pores and can clog them. Since the liquid-permeable support member is not also changed, when the settling layer is reconstituted and for that reason must not be allowed to become choked even after a repeated changing of the settling layer, the relatively great clogging danger presented by porous material rules it out as a practical liquid-permeable support member in settling layer filters.

On the basis of the recognition that plate or tube shaped support members with circular flow holes supply the most favourable conditions for the formation of stable and uniform settling layers, a detailed investigation was conducted of the production possibilities of plate and tube shaped bearing surfaces with circular holes in a range of diameters of 50 to 250 microns. It developed that the production of such members, at least from those materials of construction suitable for settling filters, e.g. stainless steel, and having wall thicknesses necessary for such bearing surfaces, i.e. of more than 0.5 mm as a rule, was confronted at the outset with difficulties which seemed insurmountable from the points of view both of technical feasability and acceptable manufacturing costs. The usual method for the production of fine-holed plate by means of needle cylinders (porcupines), which method gives very good results with relatively thin plates of e.g. 0.1 mm thickness and relatively soft materials, could not be considered practical at all for the relatively resistant and hard materials required for support members in settling filters, and for the wall thicknesses required for the stability of such members. The punching-out of the holes, or the creation of the holes by chemical means, e.g. etching, was out of the question because of the small diameter and of the necessary uniformity and smoothness of the wall of the holes. Also all other hitherto known methods of manufacture of fine-holed plates proved to be unsuitable for the purpose required, partly because it was not possible to make with such methods holes of sufficiently small diameter with the necessary uniformity, and partly because the cost of production was too high due to the necessarily large thickness and number of holes. Attempts at making the holes with needle-like tools, extending to a point at one end and mounted at the other on metal plates, were not successful either, as the needles break off already after a few hundred punchings, whereas for example a normal filter candle needs to provided with approximately 50,000 holes. The known mechanical processes for the production of individual fine holes, e.g. the process whereby a wire of suitable diameter is made to rotate at a speed of about 100,000 r.p.m. and is, so to speak, pushed with oscillations in an axial direction of 50–500 Hz a.c. through the workpiece, are far too costly from the economic and time points of view to be taken into consideration at all for the production of the members under consideration. As opposed to this, the technique recently developed, whereby fine holes are "drilled" by means of beams of rays, appeared at first glance to be suitable for the purpose intended. However, it was found that this assumption was correct with respect either to the known perforation process using beams of electron rays or to the traditional drilling process with beams of laser rays. The drilling process using electron rays has to be carried out under vacuum and is only poorly suited to such workpieces as plate or tube shaped members intended for settling filters, and in addition it is also too costly in view of the necessarily high number of holes. In the traditional drilling process by means of laser rays the expensive requirement of the carrying out of the process under vacuum is indeed eliminated, but nevertheless this process is still much too expensive in financial terms, mainly because the extraordinary small divergence of the beam of laser rays required for the drilling of the fine holes supplies, with the usual laser resonators, only an extraordinarily small working effect. This defect of the usual laser resonators, however, proved susceptible to elimination based on recent research, by using a laser resonator with a resonator length of the order of several meters (i.e. distance between the two mirrors reflecting the ray to and fro in the resonator).

The objective of the invention thus became that of developing a practical process of the kind mentioned, by means of which it is possible to produce liquid-permeable plates or tubes for filtration plant, in particular for settling filters, which were ideal in every respect, and no longer exhibited the defects and imperfections of the known and usual liquid-permeable support members.

This is achieved in accordance with the invention by means of a process characterised in that the plate or the tube is provided with a plurality of holes with circular section and a diameter of less than 0.3 mm at its narrowest point, and in that use is made for the drilling of the holes of a laser ray drilling device with a laser resonator which has a resonator length of more than 0.5 m.

A preferred execution of the process under consideration is characterised in that use is made of a laser ray drilling device having a laser resonator with two practically level mirrors and a laser rod disposed near one mirror and excitable by means of a flash lamp, having a rod length of less than 10% the distance between the mirrors, and having a lens system for focussing the laser rays emitted by the laser resonator onto the spot on the plate or tube intended for the hole to be drilled in each particular case, and in that the plate or the tube is in each particular case, during the time interval between two consecutive drillings, shifted automatically relatively to the laser ray drilling device in such a manner that the focal point of the lens system is situated after the time interval on the spot of the next hole to be drilled after the hole drilled before the time interval, and in that simultaneously during the time interval a new discharge of the flash lamp is being prepared.

The automatic displacement of the plate or tube may in this process be advantageously carried out continuously without interruption during the individual drilling operations, while the discharges of the flash lamp take place at time intervals which are greater than 100 times, preferably greater than 1000 times, the duration of a flash. The speed of the automatic shifting of the plate or tube is in this connection preferably so calculated that the time interval required required for shifting from one hole to the next is at least approximately equal to the time interval required for the preparation of a new discharge of the flash lamp.

As a laser ray drilling device, in the process under consideration, use is made appropriately of a device that has a divergence of the laser ray beam of less than $10^{-3}$.

The invention further relates to a filter candle for settling candle filters made in accordance with the present process that is characterised by a seamless stainless steel tube with a wall thickness of between 0.5 and 2 mm, which is provided in a region between two undrilled end sections with holes in a density of 20 to 400 holes per square centimeter of wall area, and in which the holes are made cylindrical or conical with an opening angle of less than 20°, or cylindrical with conical expansions at both ends of the hole and have at their narrowest portion a diameter of between 0.05 and 0.25 mm and match with one another in terms of size exactly, within 5%; and is characterised also by fixing means connected in the end region at one tube end with the tube for the incorporation of the filter candle into a candle filter and closing means connected at the end region at the other tube end for closing the filter candle at that end.

The invention relates also to a further special application of the process under consideration for the production of perforated filter plates or tubes for settling layer filters or settling candle filters, characterised in that an edge area, which is not provided with holes, is left in each case between the edges of the filter plate or filter tube and the area of the filter plate or filter tube that is provided with holes.

The invention finally relates to the use of the thus-produced plates or tubes in settling layer filtration processes and systems.

Figure 1:
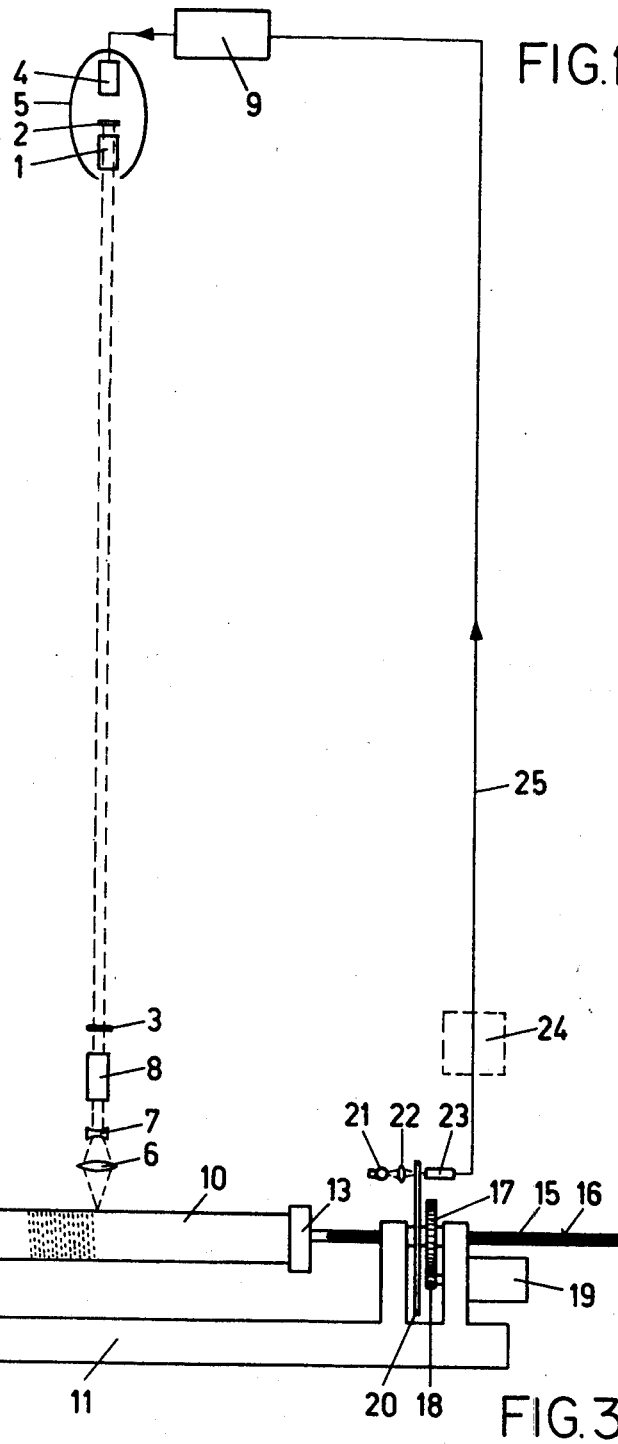

The invention is illustrated in greater detail in a preferred execution of the present process on the basis of FIG. 1 the drawing.

Figure 3A:
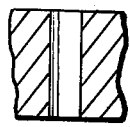
Figure 3B:
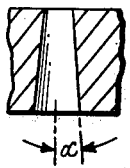
Figure 3C:
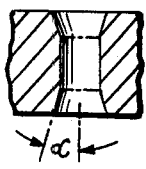

FIG. 1 of the drawing shows a device for the production of a filter candle for settling candle filters according to the present process;

FIG. 2 is a diagrammatic view of a filter candle settling layer filter unit including only a single filter candle according to the invention for purposes of illustration; and FIGS. 3a, 3b, and 3c are enlarged simplified views of the three configurations of flow openings according to the invention.

The device shown in FIG. 1 consists in principle in a laser ray drilling device, a conveyor system for the rotating and axial displacement of the filter candle tube to be provided with holes, and a control device for controlling the drilling device.

The diagrammatically represented laser ray drilling device is composed of a laser resonator, which is formed of the laser rod 1, two mirrors 2 and 3, a rod-shaped flash lamp 4 and a concave mirror 5, the lens system which is formed of the convergent lens 6, the divergent lens 7, and the telescope system 8 comprising at least two convergent lenses, and finally the supply unit 9 for the flash lamp 4. The conveyor system for rotating and axially shifting the filter candle tube 10 to be provided with holes comprises a pillow block 11, tensioning devices 12 and 13 provided for the gripping of the filter candle tube 10, a feed screw 14 bearing tensioning device 12 and mounted in a corresponding threaded bushing in the pillow block 11, a shaft 16 bearing the other tensioning device 13, slidably mounted in slide bearings in the pillow block 11, and provided with a keyway 15, a toothed wheel 17 movable in axial direction, mounted on shaft 16 and coupled so as to rotate with it by means of a key engaging into the keyway 15, a pinion 18 engaging toothed wheel 17, and an electric motor 19 fixed on pillow block 11 and driving pinion 18 (which motor may be provided with an incorporated reduction gear with stationary or step-wise regulable or also stepless adjustable reduction of speed).

The control device for controlling the laser ray drilling device comprises a hole disc 20 mounted in rotation with the toothed wheel 17 and the shaft 16, a source of light 21 with an appropriate convergent lens 22, a photocell 23 and a control lead 25 leading from the photocell 23, possibly via an impulse frequency divider 24, to the supply unit 9 for the flash lamp 4.

By means of the device illustrated in FIG. 1, a preferred process for making the filter tube 10 is carried out as follows:

The filter candle tube of the filter candle to be produced must be a seamless tube of e.g. 80 cm length, 3.2 cm outer diameter and 1 mm wall thickness. This filter candle tube is to be provided over its entire length, with the exception of 3 cm wide edge areas at both its ends, with cylindrical holes of 0.15 mm diameter. The aggregate cross-sectional area to be occupied by the holes is to be 1% of the area covered with holes. As the area covered with holes is equal to 74 cm×3.2 cm×3.1415, i.e. equal to 743.91 sq.cm., and the cross-sectional area of a hole is equal to $(0.015 \text{ cm})^2 \times 3.1415/4$, i.e. equal to $1.7671 \times 10^{-4}$ cm$^2$, it follows from the said ratio of the hole cross-sectional area to the total area of 1% taken up by the holes, that the holes number some 42,100 holes. The holes are disposed at a constant distance along a screw-thread shaped path, which the focal point of the lens system of the laser ray drilling device describes on the outer wall of the filter candle tube 10, when the filter candle tube 10 is made to rotate by the electric motor 19 and is moved simultaneously with this rotation by the feed screw 14, rotating simultaneously, in the direction of its tube axis (in FIG. 1, from right to left). (To be more precise, it should be added here that the focal point of the lens system of the laser ray drilling device does not lie exactly on the outer surface of the filter candle tube wall, but in the middle of the tube wall). The arrangement of the holes on this screwthread shaped path may be in such a way that either the centre points of each set of four adjoining holes correspond with the corner points of, e.g. a square, or the middle points of each set of three adjoining holes correspond with the corner points of an equilateral triangle.

In the first instance, i.e. when the centre points of each set of four adjoining holes are to correspond with the corner points of a square, the distance between holes is to be calculated in such a manner that the tube circumference is a complete figure multiple of it, and the flash lamp of the laser ray drilling device which effects on each energization the "drilling" of a hole is to be energized at time intervals which are equal to the reciprocal value of the product of the number of revolutions of the tube rotation by this entire figure ratio, and the tube is to be translated bodily in its axial direction at a speed which is equal to the product of the designed hole distance by the number of revolutions of the tube rotation.

In the other instance, i.e. when the centre points of each set of three adjoining holes are to correspond with the corner points of an equilateral triangle, the distance between holes is to be calculated in such a manner that the tube circumference is in a ratio to it of $(k+\frac{1}{2})$, where k is a whole number, and the flash lamp of the laser ray drilling device, which effects on each lighting the "drilling" of a hole, is to be lit at time intervals which are equal to the reciprocal value of $(k+\frac{1}{2})$ times of the number of revolutions of the tube rotation, and the tube is to be simultaneously translated bodily in its axial direction at a speed which is equal to the product of 0.866 time the designed hole distance by the number of revolutions of the tube rotation.

In the above-mentioned example with about 42,100 cylindrical holes of 0.15 mm diameter for a tube length of 74 cm of a filter candle tube of 80 cm length, 3.2. cm diameter and 1 mm wall thickness, in the event that the centre points of any set of four adjoining holes should correspond with the corner points of a square, the distance between the centre points of the holes is equal to 1.3228 mm, and the rise of the screw-thread shaped path at one turn, or the pitch of the winding of the feed screw 14, shall also be 1.3228 mm, so that the said screw-thread shaped path has about 560 windings and 76 holes per winding; while in the cases the centre points of any set of three adjoining holes correspond with the corner points of an equilateral triangle, the distance between the centre points of the holes will be equal to 1.4676 mm, and the rise of the screw-thread shaped path at one turn, or the pitch of the winding of the feed screw 14, will be equal to 1.271 mm, so that the said screw-thread shaped path has about 582 windings and 68.5 holes per winding.

In general terms the arrangement of holes is where the centre points of any set of three adjoining holes correspond with the corner points of an equilateral triangle is to be preferred to the arrangement of the holes whereby the centre points pf any set of four adjoining holes correspond with the corner points of a square, because with the triangular arrangement" there is a rather greater distance between holes and therefore a somewhat greater stability for the perforated tube; moreover, with the "triangular arrangement" the distance between any hole and all the other adjoining holes is the same, while with the "square arrangement" the distance between two diagonally opposite corner points of the square of holes is twice greater than the distance between two holes located at adjoining corner points of the square. The "triangular arrangement" of the holes, however, assumes an exact positioning of the holes, as otherwise the advantage of the greater distance between holes is lost and, under unfavourable conditions, there may even arise a distance between holes smaller by a few percent than with the "square arrangement", while in the "square arrangement" the question of positioning is not quite as critical, because a displacement of the holes in relation to the intended position, only increases of the distances between holes is possible. Nevertheless, with the "square arrangement" also, an exact positioning of the holes is desirable for reasons of uniformity alone. When exactly positioned the centre points of the holes superjacent in the longitudinal direction of the pipe lie along parallels to the tube axis.

If such an exact positioning is required, then it is appropriate to synchronise the ignition of the flash lamp of the laser ray drilling device with the rotation of the tube, and in this connection to use a synchronising device coupled with the tube rotation drive, which has at least one element rotating at the number of revolutions at the place of coupling, which element in each instance releases one ignition of the flash lamp after a rotation of the tube by an angle of rotation corresponding to the ratio of the design distance between holes to the pipe radius.

For this purpose, in the device shown in the drawing, provision is made for the above-mentioned control device for the controlling of the laser ray drilling device, which comprises a perforated disc 20, a source of light 21 with convergent lens 22, a photocell 23, a control guide 25 and optionally a impulse frequency divider 24. The perforated disc 20, which is coupled in rotation with the shaft 16 and via the latter coupled in rotation with the filter candle tube 10, is provided in the case of a "square arrangement" of the holes with 76 narrow slits of 0.05 to 0.1 mm width arranged according to the same angular distance of 4°44′12.6″ and extending radially, and in the case of a "triangular arrangement" of the holes with 137 narrow slits extending radially and disposed at an equal angular distance of 2°37′40″, and of about 0.05 mm width. The slits are arranged in the outer edge area of the perforated disc 20, so that the light emitted by the point-shaped source 21 and focussed by means of the convergent lens 22 can pass through the individual slits, when these come before the convergent lens when the disc 20 rotates and thus permit the passage of of the light to the photo-electric cell 23. The light source 21 and the convergent lens 22 may suitably be further arranged in a housing opaque to light, which is provided with a narrow slit only on the housing wall facing the disc 20, the width of which slit is approximately equal to the width of the slits in the hole disc, and the longitudinal direction of which slit corresponds with the longitudinal direction of a slit in the disc, when the latter is in a position allowing the light to pass from the source of light 21 to the photocell 23. The relevant housing wall provided with the slit should be arranged as closely as possible to the disc 20. The focal point to which the convergent lens 22 focusses the light from the light source 21, lies substantially at the centre between the two sides of the disc and substantially at the centre between the outer and the inner end of the slits in the disc. When during rotation of the perforated disc 20 one of its slits comes to a position where it allows the light from the light source 21 to pass to the photocell 22, the photocell 22 releases a control pulse. This control pulse is, in the case of a "square arrangement" of the holes led via the control guide 25 directly to the supply unit 9 of the laser ray drilling device, and, in the case of a "triangular arrangement" of the holes led to the impulse frequency divider 24 which is in this case switched into the control guide 25, and divider 24 releases an output pulse via the control guide 25 to the supply unit 9 of the laser ray drilling device only at every other pulse coming from the photocell 23. The flash lamp 4 is ignited with each pulse coming in via the control guide 25 to the supply unit 9.

The pulse frequency divider 24 is switched into the control guide 25 only in the event of a "triangular arrangement" of the holes, because with a "triangular arrangement" of the holes, 68.5 holes must be distributed over the tube circumference, and this is achieved only, when as in the case under consideration the disc 20 rotates at the same number of revolutions as the filter candle tube 10, in that provision is made for $2 \times 68.5 = 137$ slits in the disc 20, and the 137 pulses of the photocell 23 per revolution of the disc are divided by 2 by the pulse frequency divider 24.

The supply unit 9 for the flash lamp 4 consists in principle in a capacitor of very high capacity, a charging device, which charges the capacitor to a voltage sufficient for a flash discharge over the discharge path formed by the flash lamp, and in an ignition pulse generator which in each case as a pulse passes via the control guide 25 to the ignition electrode of the flash lamp 4 releases an ignition pulse and thus ignites the flash lamp or releases the discharge of the capacitor via the discharge path created by the flash lamp.

Upon ignition of the flash lamp 4 a light flash occurs over the discharge path created by the flash lamp. The duration of this light flash is of the order of microseconds and may be for example 10 micro-seconds. The light radiation emitted by the light flash is reflected by the concave mirror 5 which has the form of a rotation ellipsoid in such a manner that the light rays issuing from the light flash are concentrated again in the area of the laser rod 1. If the light source were a point-shaped light source disposed in the one focal point of the concave mirror which has the form of a rotation ellipsoid, then, as is well known, all the light rays emitted by this light source would converge again in the other focal point of the rotation ellipsoid. The flash discharge represents, however, a line-shaped light source, in the middle of which the one focal point of the rotation ellipsoid substantially lies, and correspondingly the light rays emitted by the flash discharge also converge not only in the other focal point of the rotation ellipsoid but also in a line-shaped area corresponding with the axis of the ellipsoid in the middle of which the other focal point of the rotation ellipsoid lies. The laser rod 1 is disposed in this area. In this connection it should be further mentioned that both the flash lamp 4 and the laser rod 1 are represented on the drawing with exaggerated diameters. In actual fact the diameter or the thickness of these two rod-shaped elements is below 5% the rotation ellipsoid formed by the concave mirror. In the drawing the width of the two elements, however, was increased so that the outer limits of the laser ray beam should not merge into one line.

With the energy of the light radiation emitted by the flash discharge concentrated onto the laser rod 1, the laser rod 1 is "pumped up", that is to say energy is stored in the laser rod by the excitation of the paramagnetic ions distributed in it, as electrons of these ions are raised to a higher quantum condition, and the light supplied to the laser rod is absorbed for the purpose. The intensity of the flash discharge, or the level of the pumping energy supplied to the laser rod 1, is in this case measured in such a manner that relaxation oscillations of the energy stored in the laser rod is released in a relatively short time (order of duration of 0.1 microsecond) in the form of short energy pulses, so-called spikes, and the storage of new energy in the laser rod until the next short energy pulse then requires a considerably greater period of time than the duration of this short energy pulse. The level of pumping energy is determined by the intensity of the flash discharge and can accordingly be influenced within certain limits by the level of the voltage at which the capacitor supplying the energy for the flash discharge is discharged. This process of the storage of the new energy between two short energy pulses supplied by the laser rod corresponds to the building-up process of a resonance vibration circuit of high quality. The resonance vibration circuit is in this case built up by the laser rod 1 and the two mirrors 2 and 3, of which mirror 3 is partly permeable for the decoupling of a portion of the vibration energy of the resonance vibration circuit. It is essential that mirror 3 should be arranged, contrary to the mirror arrangement of the generally used laser resonators, at a relatively great distance (of the order of meters) from the laser rod 1 and from the mirror 2 located in the vicinity thereof, and that the two mirrors 2 and 3 should be practically identical. This is in fact attained in that the part of the total volume of the laser rod 1 participating in the resonance vibration is approximately equal to the actual volume of the laser rod, while this part in the usual laser resonators is below 5% of the total volume of the laser rod, as soon as the laser rod has heated up on a relatively high supply of energy, as is required for drilling by means of laser rays. As the portion of the volume of the laser rod participating in the resonance vibration is, in the laser ray drilling device, approximately equal to the total volume of the laser rod 1, ions are excited in the laser ray drilling device under consideration only in a small portion of the volume of the laser rod, that is to say only in the portion of the volume that does not participate in the resonance vibration, by the pumping energy. These ions are not able to supply to the resonance vibration their energy absorbed during the excitation, and their energy absorption therefore constitutes a loss of energy. In the laser ray drilling device under consideration, as opposed to the usual laser ray devices with solid-lasers relatively little pumping energy is therefore lost, or in other words the degree of effectiveness of the conversion of the light energy emitted by the flash lamp into laser ray energy is relatively great. This again leads to a considerably smaller required flash discharge energy and thereby to a considerably smaller charging of the flash lamp 4, which results in a many times longer life of the flash lamp.

The light energy passing through the partly permeable mirror 3 and supplied from the laser resonator is concentrated by means of the lens system comprising the telescope system 8, the divergent lens 7 and the convergent lens 6 onto the drilling locus in such a way that the focal point of the light beamed by the convergent lens 6 lies substantially in the centre between outer and inner wall of the filter candle tube 10 at the place drilling locus. As a consequence of the divergence of the beam of laser rays, i.e. the not quite parallel progress of the individual rays of the beam of rays, there does not arise in the area of the focal point of the beam of laser rays any double-cone shaped beaming of the laser rays but a substantially cylindrical area through which radiation passes, and which is called "caustic". Within this area, if the intensity of the laser radiation is sufficient, the metallic material of the filter candle tube being produced is evaporated. The evaporation process progresses in detail in such a manner that a metal layer of the diameter of the burning spot or "caustic", of relatively small thickness is evaporated by each of the short energy pulses emitted by the laser rod, the so-called "spikes", and the metal vapour thus formed escapes during the time elapsing before the next "spike" from the already burnt-in hole cut-out portion. The escape of the metal vapour is important, because otherwise if there were too great a density of metal atoms in the hole, a considerable proportion of the energy supplied by each energy pulse would be absorbed by the metal atoms and thus would be lost to the "drilling process". For this reason it is of importance that the "spikes" should follow one another at time intervals that are as much as possible of equal duration, which is the case with the laser ray drilling device under consideration. The even succession of "spikes" is apparently the result of the fact that because of the great distance between mirrors 2 and 3 in the laser resonator only natural vibrations of very low value are amplified or the resonator vibrates only with these natural vibrations.

The radius of the holes which are "drilled" by means of the present laser ray drilling device in the filter candle tube to be produced is equal to the product of the divergence of the beam of laser rays by the focal length of the convergent lens 6. As the divergence of the beam of light rays is a magnitude pre-supplied by the laser resonator, the lens system or the focal length of the convergent lens 6 is accordingly to be chosen in such a manner that the hole diameter desired is achieved. Should the holes to be drilled widen out conically on one side, e.g. from the outer wall towards the inner wall of the filter candle tube, the lens system must be shifted in such a manner that the theoretical focal point of the beam of rays is shifted towards the other side, in other words, for the example chosen, towards the outer wall. When the conicity is small, completely conical holes can also be achieved. In this case the theoretical focal point of the laser rays must lie substantially at the same level as the outer wall, if a hole is desired that widens inwardly to conical, and substantially at the level of the inner wall if a hole is desired that narrows down to conical from outside to inside. With a theoretical focal point of the beam of rays lying in the centre between outer wall and inner wall, the form of the hole is, as already stated, substantially cylindrical, when, should this be required, in particular with very narrow holes, conical widenings may be available at both hole ends. With conical or conically-widened holes, the diameter at the narrowest part corresponds to double the product of the divergence of the beam of light rays by the focal length of the convergent lens 6.

The period of time for the drilling of a hole corresponds fairly exactly to the burning time of the flash discharge and is accordingly of the order of 10 microseconds. The time required for the charging of the capacitor in the supply unit 9 is, on the other hand, comprised between 10 and 100 msec and is thus 1000 to 10,000 times greater than the drilling time. Therefore it is not necessary to stop the rotation of the filter candle tube 10 during the drilling of the hole, as the hole distance is indeed of the order of size of millimeters and accordingly the shifting of the hole during actual "drilling" is only of the order of 0.1 micron.

The rotational speed of the filter candle tube 10 is suitably measured in such a manner that the time interval necessary for shifting from one hole to the next is at least approximately equal to that needed for the preparation of a new discharge of the flash lamp 4, and therefore for the charging of the capacitor in the supply unit 9. For this purpose, the filter candle tube 10 is rotated continuously at a number of revolutions which is at least approximately equal to the ratio of the intended hole distance to the product of the tube circumference by the time duration necessary for the preparation of a new discharge of the flash lamp, and in each case immediately after the completion of the preparation of a discharge of the flash lamp, or immediately after the completion of the charging of the capacitor provided in the supply unit 9, the flash lamp is ignited, and the flash discharge performed, and immediately afterwards a start is made in the preparation of a new discharge, i.e. in recharging of the capacitor.

The automatic shifting during the production of a perforated filter candle tube may naturally consist in a superposition of a step-wise rotational movement of the tube about its axis and a simultaneous step-wise translatory movement of the tube in the direction of the tube axis, when the focal point of the lens system also describes a screw-thread shaped path on the outer wall of the tube. In this case, instead of the electric motor 19 rotating at a constant speed for the drive of the tube rotation, use should be made of a step-by-step motor, which is supplied with a current pulse per step. Thus, ignition of the flash lamp can advantageously be released by each such current pulse, preferably by the wave front thereof, and the control device for controlling the laser ray drilling device, which is composed of the hole plate 20, the light source 21, the convergent lens 22, the photocell 23 and optionally the pulse frequency divider 24, can be dispensed with.

Actual filter candle systems using perforated filter candle tubes according to the present invention (specifically tube diameter 32 mm, wall thickness 1 mm, hole diameter 0.15 mm, distance between holes 1.468 mm, holes in triangular arrangement, seamless rolled tube of stainless steel) have proved themselves outstanding effective in extensive tests carried out under the usual operational conditions prevailing, and have in particular made possible settling layers of stability considerably greater than the stability hitherto obtained. In addition, the uniformity of the settling layers obtained was considerably better than in all filter candle constructions hitherto known. A further significant advantage of these filter candles is that they tend to become choked to a considerably smaller extent than all other known filter candle designs, and therefore remain operative for a considerably longer period, before cleaning required for the elimination of such stoppages becomes necessary. Finally, the present filter candles have also very good rejection properties for the washing off of the sediment in rewashing operations, which are rather better than the most favourable rejection properties attained hitherto, and in addition, as compared with the majority of filter candle constructions known up until now, they have the advantage of a very high mechanical stability and of a relatively high insensitivity to impact, as can happen during transport and assembly of the filter candles. (Such impact stresses in the majority of filter candle constructions result in damage which is highly detrimental to the effectiveness of the candle, because, due to such damage, widenings of the flow openings may develop and at such places stable settling layer cannot be formed.)

With the present process it is naturally also possible to produce flat perforated filter plates which can be used for settling layer filters. In this case, the automatic shifting in the production of a perforated rectangular or square plate may appropriately consist in such a translatory movement of the plate that the focal point of the lens system describes a meandering line on the plate, and in the production of a perforated circular plate it may suitably consist in the superimposition of a rotary movement and a translatory movement of the plate in its own plane, so that the focal point on the lens system describes a spiral on the plate. Advantageously in this connection, in the construction of both a rectangular or square perforated plate and of a circular perforated plate, the distance between adjoining line portions of the meandering or spiral line and the arrangement of the holes on these line portions may be selected in such a manner that either the centre points of any set of three adjoining holes correspond with the corner points of an equilateral triangle, or, however, the centre points of any set of four adjoining holes correspond with the corner points of a square, as previously explained.

The use of perforated plates or candle tubes of the invention in actual filtration follows conventional practice, merely substituting the present plates or tubes for the corresponding prior art members employed previously. Thus, it is unnecessary to describe the various operating conditions used in actual filtration because they are the same as in the prior art. The operative arrangement of the present support members is illustrated somewhat diagrammatically in FIG. 2 which shows a partially in cross-section simplified filter candle system including a single representative candle tube 31, which is perforated with myriad openings of circular cross-section according to the invention, although at the scale of this drawing such openings are not visible in the drawing, a settling layer 32 of filtration assistant particles, preferably kieselguhr, represented by cross-hatching, and a layer 33 of sediment removed during filtration, represented by stippling. The tube 31 is closed at one end by a cap 34 and is engaged at the other end in a partition 35 from which the tube hangs within a housing 36. The liquid to be filtered is introduced by a line 37 into the lower end of housing 36 and filtered liquid is removed by a line 38 from the upper end which communicates with the tube interior.

The three configurations for the flow openings contemplated by the invention are shown on a greatly enlarged and exaggerated scale in FIGS. 3a, 3b, and 3c, respectively, where $\alpha$ is the angle of conicity and does not exceed 20°.

I claim:

1. In a process of filtering fluids utilizing as the active filtering component a layer of filter aid particles settled directly on and supported by a sheet-metal support provided with openings for passage of the filtered fluid moving through said filter aid layer, said filter aid particles being from the group comprising kieselguhr and other particles with similar irregular surfaces which promote bridging and are smaller in particle size diameter than the smallest diameter of said openings, wherein the liquid to be filtered is introduced on the side of said filter aid layer opposite said support and removed downstream of said support, the improvement of using as said support a support penetrated by a multitude of rotary symmetric openings of circular cross-section throughout their length and having a diameter of their narrowest point in the range of 50 to 250 microns, the walls of said opening making an angle of less than about 20° with the opening axis, whereby the particles form bridges over the openings in the configuration of dome-shaped arches, and said support provides around the margin of each such opening a generally flat stable bearing surface for supporting the end of said dome-shaped arch and having a width at least corresponding to the opening diameter, whereby said filter aid layer exhibits an increased stability to breakdowns of said bridges due to sudden pressure changes in the unfiltered fluid or high pressure drops over said layer.

2. The process of claim 1 wherein said support has a thickness of at least about 0.5 mm, and said openings are generally uniformly distributed with a density of about 20–400 openings in sq.cm of surface area of said support.

3. Filter candle apparatus comprising in combination, at least one filter candle consisting of a stainless steel tube having a wall thickness in the range of 0.5 to 2 mm, closure means at one end of each such tube, coupling means at the other end of each such tube for installing the filter candle within the housing of the filter candle apparatus for fluid communication between the interior of the tube and the filtered liquid outlet of the apparatus, perforations in the form of rotary-symmetric openings in said tube wall, said openings further being constructed and arranged to have opening diameters in the range of 50 to 250 microns within a generally uniform density of 20 to 400 openings per square centimeter of tube sidewall area, and a layer of filter aid particles covering the exterior surface of the filter candle in direct contact therewith, said filter aid particles being from the group comprising kieselguhr and other particles with similar irregular surfaces which promote bridging, the particle size diameter of the filter aid particles being smaller than the smallest diameter of said openings, whereby the irregular shape of said filter aid particles causes dome-shaped bridging of said particles over said openings without passage of the particles therethrough notwithstanding the smaller diameter of said particles relative to the openings.

* * * * *